(12) United States Patent
Wang Tsai

(10) Patent No.: US 11,915,621 B2
(45) Date of Patent: Feb. 27, 2024

(54) LABEL STICKER

(71) Applicant: Chin-Chih Wang Tsai, Taipei (TW)

(72) Inventor: Chin-Chih Wang Tsai, Taipei (TW)

( * ) Notice: Subject to any disclaimer, the term of this patent is extended or adjusted under 35 U.S.C. 154(b) by 0 days.

(21) Appl. No.: 17/474,124

(22) Filed: Sep. 14, 2021

(65) Prior Publication Data

US 2021/0407324 A1 Dec. 30, 2021

Related U.S. Application Data

(63) Continuation-in-part of application No. 16/525,638, filed on Jul. 30, 2019, now abandoned.

(30) Foreign Application Priority Data

Sep. 11, 2018 (TW) ................................. 107131807

(51) Int. Cl.
*G09F 3/10* (2006.01)
*B32B 5/02* (2006.01)
(Continued)

(52) U.S. Cl.
CPC .................. *G09F 3/10* (2013.01); *B32B 5/02* (2013.01); *B32B 5/26* (2013.01); *B32B 7/06* (2013.01);
(Continued)

(58) Field of Classification Search
CPC ........ G09F 3/10; G09F 3/02; G09F 2003/023; G09F 2003/0257; B32B 5/02; B32B 5/26; B32B 7/06; B32B 7/12; B32B 27/08; B32B 27/10; B32B 27/12; B32B 27/32; B32B 29/005; B32B 29/02; B32B 2255/12; B32B 2255/26; B32B 2262/0276; B32B 2307/732; B32B 2519/00; B32B 2250/02; B32B 2255/02; B32B 7/05; B32B 29/00; C09J 7/29; C09J 2203/334;
(Continued)

(56) References Cited

U.S. PATENT DOCUMENTS 3,153,868 A * 10/1964 Jones ........................ G09F 3/10
D20/27
3,995,087 A 11/1976 Desanzo
(Continued)

OTHER PUBLICATIONS

Non-Final Office Action dated Feb. 23, 2021 for U.S. Appl. No. 16/525,638.
(Continued)

*Primary Examiner* — Patricia L. Nordmeyer
(74) *Attorney, Agent, or Firm* — Schmeiser, Olsen & Watts, LLP

(57) ABSTRACT

A label sticker is provided and includes: a base layer; a release layer coated on an upper surface of the base layer; a first surface material layer having a lower surface coated with a first glue layer and coated on or adhered to the release layer through the first glue layer; and a second surface material layer having a lower surface coated with a second glue layer and adhered to an upper surface of the first surface material layer through the second glue layer. The area of the second surface material layer is greater than the area of the first surface material layer. The label sticker. Therefore, glue residues left behind by a process of making the label sticker do not interfere with use thereof.

4 Claims, 4 Drawing Sheets

(51) Int. Cl.
| | |
|---|---|
| *B32B 29/00* | (2006.01) |
| *B32B 5/26* | (2006.01) |
| *B32B 27/08* | (2006.01) |
| *B32B 7/12* | (2006.01) |
| *C09J 7/29* | (2018.01) |
| *B32B 27/32* | (2006.01) |
| *B32B 27/10* | (2006.01) |
| *B32B 29/02* | (2006.01) |
| *B32B 27/12* | (2006.01) |
| *B32B 7/06* | (2019.01) |
| *G09F 3/02* | (2006.01) |

(52) U.S. Cl.
CPC ............... *B32B 7/12* (2013.01); *B32B 27/08* (2013.01); *B32B 27/10* (2013.01); *B32B 27/12* (2013.01); *B32B 27/32* (2013.01); *B32B 29/005* (2013.01); *B32B 29/02* (2013.01); *C09J 7/29* (2018.01); *G09F 3/02* (2013.01); *B32B 2255/12* (2013.01); *B32B 2255/26* (2013.01); *B32B 2262/0276* (2013.01); *B32B 2307/732* (2013.01); *B32B 2519/00* (2013.01); *C09J 2203/334* (2013.01); *C09J 2301/312* (2020.08); *C09J 2433/00* (2013.01); *G09F 2003/023* (2013.01); *G09F 2003/0257* (2013.01); *Y10T 428/1476* (2015.01)

(58) Field of Classification Search
CPC ............. C09J 2301/312; C09J 2433/00; Y10T 428/1476; Y10T 428/14
See application file for complete search history.

(56) References Cited

U.S. PATENT DOCUMENTS

| | | | |
|---|---|---|---|
| 4,778,703 A | | 10/1988 | Fontanilla |
| 5,074,595 A | * | 12/1991 | Hill ................. G09F 3/0289 229/92.1 |
| 5,240,789 A | * | 8/1993 | Breen ............... G09F 3/0288 40/626 |
| 5,482,779 A | | 1/1996 | Bausewein et al. |
| 8,458,941 B2 | * | 6/2013 | Pagones ................ B31D 1/027 40/638 |

OTHER PUBLICATIONS

Final Office Action dated Jun. 15, 2021 for U.S. Appl. No. 16/525,638.

* cited by examiner

LABEL STICKER

CROSS-REFERENCE TO RELATED APPLICATION

This application is a continuation-in-part patent application of U.S. application Ser. No. 16/525,638 filed on Jul. 30, 2019, which claims priority to Taiwanese Patent Application No. 107131807 filed on Sep. 11, 2018, the entire contents both of which are hereby incorporated by reference for which priority is claimed under 35 U.S.C. § 120.

BACKGROUND OF THE INVENTION

1. Field of the Invention

The present disclosure relates to label stickers, and in particular to a label sticker conducive to preventing process-induced residues from interfering with use of the label sticker.

2. Description of the Related Art

Conventional stickers rarely come with high-viscosity glue, in order to avoid two issues: first, owing to excessive viscosity on adhesive surfaces of the conventional stickers, residues stay on the surface of a machine for making the conventional stickers; second, after the conventional stickers haven been torn off an object, residues are left behind on the surface thereof. On the other hand, conventional label stickers use high-viscosity glue in order to adhere to surfaces smeared with oil, water and dust or low-temperature objects. However, during the process of making the conventional label stickers, not only is the high-viscosity glue on a continuous sticker caught by a knife of a cutter whenever the cutter cuts the continuous sticker, but the caught high-viscosity glue is also lifted by the knife of the cutter as soon as the cutter finishes cutting the continuous sticker and exits the continuous sticker, as shown in FIG. 1, thereby causing residues 21 to stay at the edges of the surface of the label sticker finished product 2. Furthermore, upon separation of the label sticker finished product 2 and process-induced continuous waste, the high-viscosity glue is lifted off the label sticker finished product 2, thereby leaving the residues behind at the edges of the surface of the label sticker finished product 2.

The residues left behind at the edges of the surface of the label sticker finished product 2 are likely to carry dust and dirt and thus render the edges of the surface of the label sticker finished product 2 dirty to the detriment of the beauty of the label sticker finished product 2. Moreover, bundling the label sticker finished product 2 or applying a printing ink to the surface of the label sticker finished product 2 is likely to cause the residues on the surface of the label sticker finished product 2 to interfere with the operation of a machine for use in printing the label sticker finished product 2, deteriorate printing quality or even cause the machine to fail. In addition, should the label sticker function as an insulating element for use by electric appliances, the residues on the label sticker surface might also be caught by any other components. Therefore, it is important to provide a solution to preventing process-induced residues from interfering with use of label stickers.

BRIEF SUMMARY OF THE INVENTION

An objective of the present disclosure is to provide a label sticker conducive to preventing process-induced residues from interfering with use of label stickers.

To achieve at least the above objective, the present disclosure provides a label sticker, comprising: a base layer; a release layer coated on an upper surface of the base layer; a first surface material layer with a lower surface which a first glue layer is coated on or adheres to, wherein the lower surface of the first surface material layer attaches to the release layer through the first glue layer; and a second surface material layer with a lower surface which a second glue layer is coated on or adheres to, wherein the lower surface of the second surface material layer attaches to an upper surface of the first surface material layer through the second glue layer, wherein area of the second surface material layer is greater than area of the first surface material layer.

DETAILED DESCRIPTION OF THE INVENTION

To facilitate understanding of the object, characteristics and effects of this present disclosure, embodiments together with the attached drawings for the detailed description of the present disclosure are provided.

Figure 1:
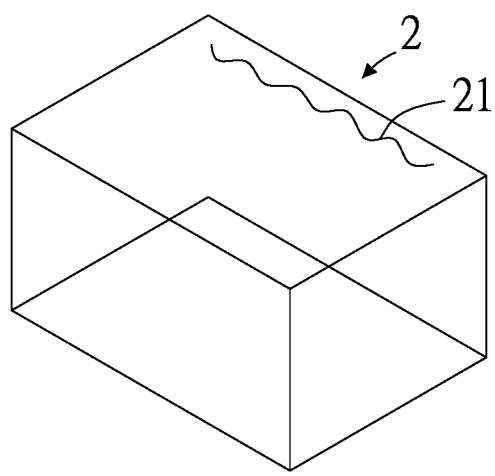
FIG. 1 (PRIOR ART) is a schematic view of residues on a conventional label sticker.
Figure 2:
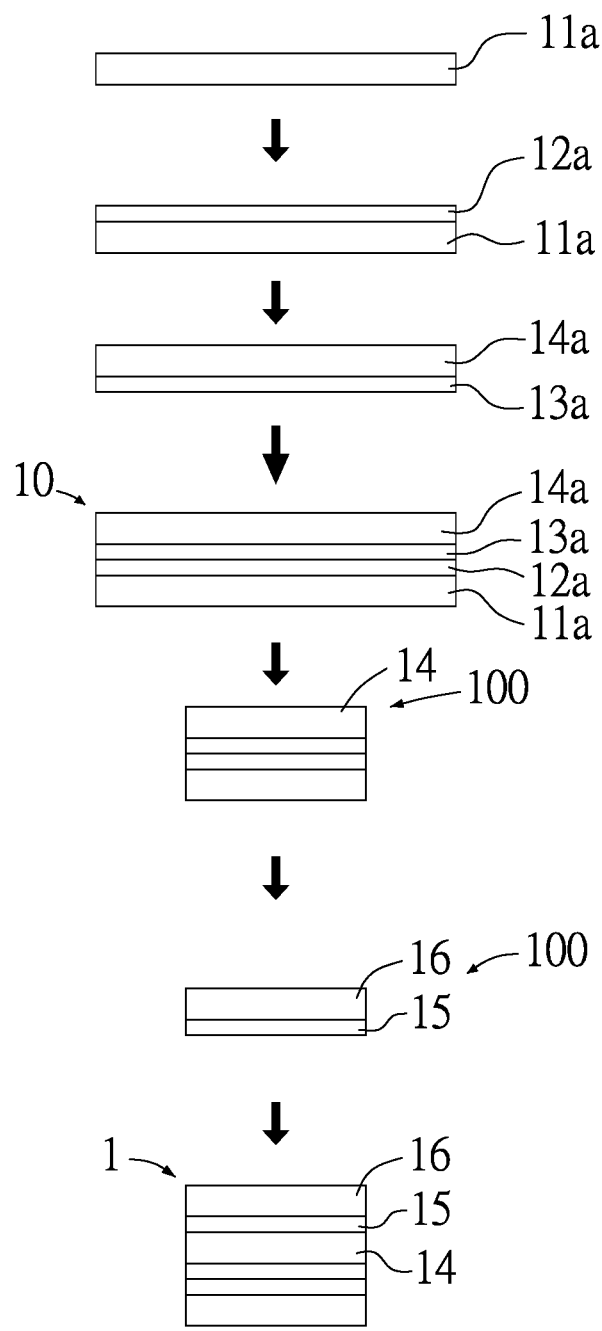
FIG. 2 is a schematic view of the process of making a label sticker according to the first embodiment of the present disclosure.

The first embodiment of present disclosure provides a label sticker 1. Referring to FIG. 2, the process of making the label sticker 1 is described below.

A continuous base layer 11a is provided. A continuous release layer 12a is coated on the upper surface of the continuous base layer 11a. Then, a continuous first surface material layer 14a is provided. A high-viscosity glue 13a is coated on the lower surface of the continuous first surface material layer 14a. The lower surface of the continuous first surface material layer 14a is attached to the continuous release layer 12a, such that the continuous base layer 11a, the continuous release layer 12a, the high-viscosity glue 13a and the continuous first surface material layer 14a form a continuous sticker sheet 10. Then, the continuous sticker sheet 10 is cut with a cutter (not shown). Next, continuous waste (not shown) of the continuous sticker sheet 10 thus cut is lifted, thereby producing a plurality of sticker structures 100. Like conventional label stickers, the sticker structures 100 have disadvantages as follows: owing to the aforesaid cutting process, a knife of the cutter catches the high-viscosity glue 13a; as soon as the cutter finishes cutting the continuous sticker sheet 10 and then exits the continuous sticker sheet 10, the cutter lifts the caught residues of the high-viscosity glue 13a and allows the residues to stay at the edges of the upper surfaces of the first surface material layers 14 of the sticker structures 100.

In the first embodiment, to prevent the residues staying at the edges of the upper surfaces of the first surface material layers 14 of the sticker structures 100 from interfering with the use of label stickers, the upper surfaces of the first surface material layers 14 of the sticker structures 100 are each covered with a second surface material layer 16. The second surface material layer 16 covers the residues at the edges of the upper surfaces of the first surface material layers 14 of the sticker structures 100, thereby preventing the residues staying at the edges of the upper surfaces of the first surface material layers 14 of the sticker structures 100 from interfering with the use of the label stickers 1, The process of covering the upper surfaces of the first surface material layers 14 of the sticker structures 100 with a second surface material layer 16 each is described below.

The lower surface of the second surface material layer 16 of the sticker structure 100 is coated with low-viscosity glue to form a low-viscosity glue layer 15. Then, the lower surface of the second surface material layer 16 is attached to the upper surface of the first surface material layer 14 of the sticker structure 100. The second surface material layer 16 corresponds in shape to the sticker structure 100. The area of the second surface material layer 16 is equal to the area of the sticker structure 100. Thus, the label sticker 1 of the first embodiment is made. After that, the label sticker 1 undergoes a printing process or a printing process. For example, ink, carbon ribbon or carbon powder is applied to the second surface material layer 16 of the label sticker 1, allowing the label sticker 1 to function as an identification label, advertisement label or insulating label. However, the label sticker 1 may also undergo any other processing processes as needed and thus is not restrictive of the first embodiment.

Figure 3:
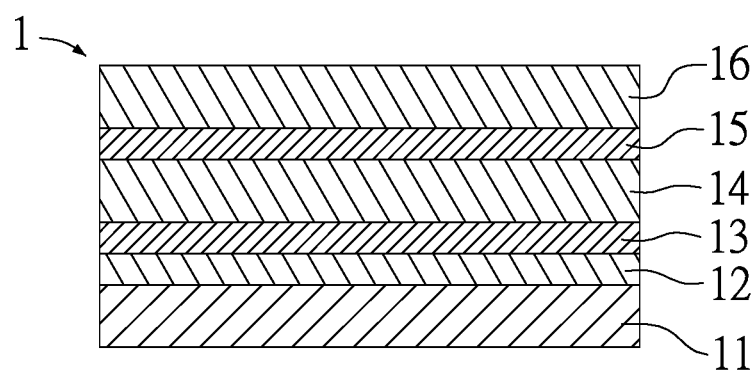
FIG. 3 is a cross-sectional view of the label sticker according to the first embodiment of the present disclosure.

Referring to FIG. 3, the label sticker 1 comprises a base layer 11, a release layer 12, a high-viscosity glue layer 13, a first surface material layer 14, a low-viscosity glue layer 15 and a second surface material layer 16. The release layer 12 is coated on the upper surface of the base layer 11. The lower surface of the first surface material layer 14 is coated with the high-viscosity glue layer 13. The lower surface of the first surface material layer 14 is attached to the release layer 12 through the high-viscosity glue layer 13. The lower surface of the second surface material layer 16 is coated with the low-viscosity glue layer 15. The lower surface of the second surface material layer 16 is attached to the upper surface of the first surface material layer 14 through the low-viscosity glue layer 15. The second surface material layer 16 corresponds in shape to the first surface material layer 14. The area of the second surface material layer 16 is equal to the area of the first surface material layer 14. Thus, the second surface material layer 16 can reach and cover the edges of the upper surface of the first surface material layer 14.

That the area of the second surface material layer 16 is equal to the area of the first surface material layer 14 means that they have the same actual area, which requires the second surface material layer 16 to have slightly greater area than the first surface material layer 14 because of tolerance or production needs. With the naked eye, the surface of the second surface material layer 16 looks slightly larger than the surface of the first surface material layer 14, albeit inconspicuously.

During the process of making the label sticker 1, residues of high-viscosity glue are found at the edges of the upper surface of the first surface material layer 14. With the first surface material layer 14 being covered with the second surface material layer 16, the residues at the edges of the upper surface of the first surface material layer 14 are also covered with the second surface material layer 16. The label sticker 1 is conducive to preventing the residues from interfering with subsequent use of the label sticker 1, for example, adhering to an object to display a identifier or performing a printing process on the surface of the label sticker 1.

In the first embodiment, the second surface material layer 16 is of a thickness of 0.05 mm. However, in another embodiment, the second surface material layer is of a thickness of 0.01 mm 0.1 mm or is, to meet the other needs, of another thickness. Alternatively, the first surface material layer 14 and the second surface material layer 16 are of the same thickness or is, to meet the other needs, of another thickness.

In the first embodiment, the low-viscosity glue layer 15 is of a thickness of 0.03 mm. In another embodiment, the low-viscosity glue layer 15 is of a thickness of 0.01 mm~0.1 mm or is, to meet the other needs, of another thickness. Alternatively, the high-viscosity glue layer 13 and the low-viscosity glue layer 15 are of the same thickness. Alternatively, the high-viscosity glue layer 13 is of any other thickness in order to meet the other needs.

In the first embodiment, the base layer 11 is made of Glassine. However, in another embodiment, the base layer 11 is made of a material which is not only well-known but can also be coupled to the release layer 12. In the first embodiment, the release layer 12 is made of silicone. In yet another embodiment, the base layer 11 and the release layer 12 are provided in the form of polyethylene release paper.

The first surface material layer 14 and the second surface material layer 16 are made of Tetoron, i.e., polyester fiber. In another embodiment, the first surface material layer 14 and the second surface material layer 16 are made of printing paper, Tetoron, polypropylene synthetic paper or any existing material for use in supporting a glue, but the first embodiment is not limited thereto.

In the first embodiment, the high-viscosity glue is of a viscosity greater than 2 Pa·s or is able to adhere to slippery objects. In the first embodiment, the viscosity glue is of a higher viscosity than the low-viscosity glue layer. The high-viscosity glue layer 13 is made of oily acrylic adhesive. However, in another embodiment, the high-viscosity glue layer 13 made of aqueous acrylic adhesive, hot-melt adhesive, silica gel or any material which is well-known and able to be for use in the high-viscosity glue, but the first embodiment is not limited thereto. In the first embodiment, the lower surface of the first surface material layer 14 is coated with the glue which the high-viscosity glue layer 13 is made of, such that the high-viscosity glue layer 13 attaches to the lower surface of the first surface material layer 14. In another embodiment, the high-viscosity glue layer 13 is an adhesive film (t adhesive film is underpinned by polyethylene terephthalate substrate or cotton substrate), and the adhesive film adheres to the lower surface of the first surface material layer 14, such that the high-viscosity glue layer 13 attaches to the lower surface of the first surface material layer 14.

In the first embodiment, the low-viscosity glue is of a viscosity less than 2 Pa·s or can be readily removed from any object otherwise attached to. In the first embodiment, the low-viscosity glue is of a lower viscosity than the high-viscosity glue layer. The low-viscosity glue layer 15 is made of aqueous acrylic adhesive. However, in another embodiment, the low-viscosity glue layer 15 is made of oily acrylic adhesive, silica gel, rubber, hot-melt adhesive, or any existing material for use in low-viscosity glue, but the first embodiment is not limited thereto.

Figure 4:
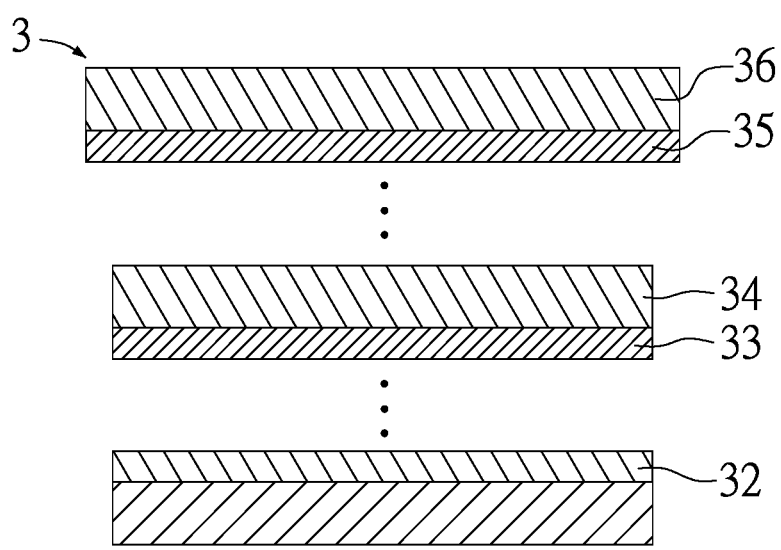
FIG. 4 is a cross-sectional exploded view of the label sticker according to the second embodiment of the present disclosure.

The second embodiment of the present disclosure provides a label sticker 3. Referring to FIG. 4, the label sticker 3 is substantially identical to the label sticker 1 in terms of manufacturing process and structure except for technical features described below. A first glue layer 33 is coated on (or adheres to) the lower surface of the first surface material layer 34 of the label sticker 3. The lower surface of the first surface material layer 34 attaches to the release layer 32 through the first glue layer 33. A second glue layer 35 is coated on (or adheres to) the lower surface of the second surface material layer 36 of the label sticker 3. The lower surface of the second surface material layer 36 adheres to the upper surface of the first surface material layer 34 through the second glue layer 35. In the second embodiment, the first glue layer 33 and the second glue layer 35 are of the same viscosity and are made of the adhesive mentioned in the first embodiment n another embodiment the first glue layer 33 is the high-viscosity glue layer defined in the first embodiment, and the second glue layer 35 is the low-viscosity glue layer defined in the first embodiment.

Figure 5:
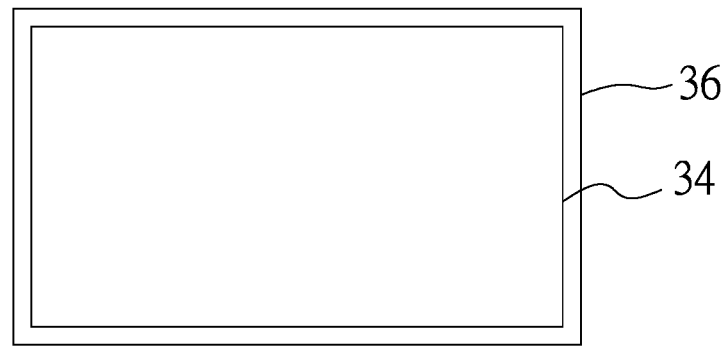
FIG. 5 is a schematic view of the area of a first surface material layer and the area of a second surface material layer of the label sticker according to the second embodiment of the present disclosure.
Figure 6:
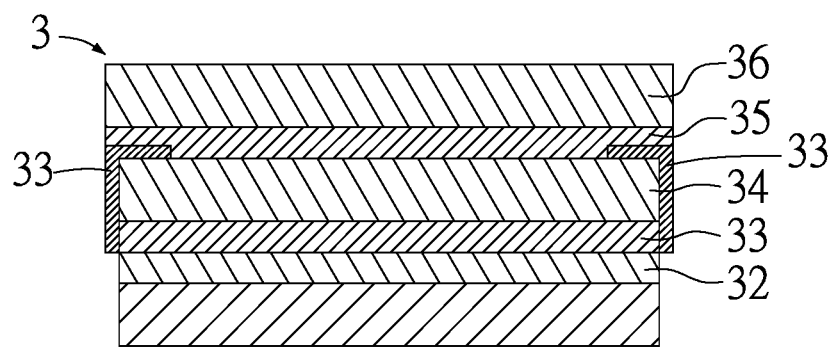
FIG. 6 is a schematic view of how to prevent surplus glue from adhering to the surface of the label sticker according to the second embodiment of the present disclosure.

Referring to FIG. 5, the area of the second surface material layer 36 is greater than the area of the first surface material layer 34. The length of the second surface material layer 36 is greater than the length of the first surface material layer 34 by 10 µm. The width of the second surface material layer 36 is greater than the width of the first surface material layer 34 by 10 µm. Therefore, the residues left behind at the edges of the upper surface of the first surface material layer 34 is concealed by the second surface material layer 36 of an area slightly greater than the first surface material layer 34 to thereby prevent the residues from interfering with the subsequent use of the label sticker 3. On the other hand, label sticker products are usually presented in the form of multiple label stickers adhered to one single band, and every such continuous, slender label sticker product is offered to consumers in the form of a compact roll of tape for the sake of storage. The label stickers of the compact roll of tape are subjected to compression increasing in the direction from the outermost ones to the innermost ones. As a result, the glue layers of the innermost label stickers are subject to the greatest compression and thus likely to be squeezed and leak. This phenomenon is most likely to happen to the rolls of tape which have been stored for a long period of time. Referring to FIG. 6, suppose the label sticker product is provided in form of a roll, and thus the first glue layer 33 of the label sticker 3 leaks and reaches the edge of the upper surface of the first surface material layer 34, but the second surface material layer 36 of a greater area than the first surface material layer 34 can stop the first glue layer 33 from making further inroads to the upper surface of the second surface material layer 36.

In another embodiment, the length of the second surface material layer 36 is greater than the length of the first surface material layer 34 by at least 1 µm~20 µm, and the width of the second surface material layer 36 is greater than the width of the first surface material layer 34 by at least 1 µm~20 µm, but the second embodiment is not limited thereto.

In the second embodiment, the second glue layer 35 is of a thickness of 15 µm which prevents its leakage out of the second surface material layer 36 or its inroads to the upper surface of the second surface material layer 36. However, in another embodiment, to prevent the leakage or inroads of the second glue layer 35 to the upper surface of the second surface material layer 36, the second glue layer is of a thickness of 1 µm~20 µm, but the second embodiment is not limited thereto.

Regarding the label sticker, with the first surface material layer being covered with the second surface material layer, residues at the edges of the upper surface of the first surface material layer is covered with the second surface material layer. Therefore, the label sticker is conducive to preventing the process-induced residues from interfering with subsequent use of the label sticker.

While the present disclosure has been described by means of specific embodiments, numerous modifications and variations could be made thereto by those skilled in the art without departing from the scope and spirit of the present disclosure set forth in the claims.

What is claimed is:

1. A label sticker, comprising:
a base layer;
a release layer coated on an upper surface of the base layer;
a first surface material layer with a lower surface which a first glue layer is coated on or adheres to, wherein the lower surface of the first surface material layer attaches to the release layer through the first glue layer; and
a second surface material layer with a lower surface which a second glue layer is coated on or adheres to, wherein the lower surface of the second surface material layer attaches to an upper surface of the first surface material layer through the second glue layer,
wherein the first glue layer is of a thickness of 0.001 mm to 0.02 mm, the second glue layer is of a thickness of 0.001 mm to 0.02 mm, the length of the second surface material layer is greater than the length of the first surface material layer by 0.01 mm to 0.02 mm, the width of the second surface material layer is greater than the width of the first surface material layer by 0.01 mm to 0.02 mm.

2. The label sticker of claim 1, wherein the first glue layer is of a viscosity greater than 2 Pa·s.

3. The label sticker of claim 1, wherein the second glue layer is of a viscosity less than 2 Pa·s.

4. The label sticker of claim 1, wherein the second glue layer is of a thickness of 0.015 mm.

* * * * *